United States Patent Office 3,767,711
Patented Oct. 23, 1973

3,767,711
PROCESS FOR PRODUCING ISOPROPANOL
AND ACETONE
Georges Gobron, Claude Gilbert Falize, and Henri
Dufour, Melle, Deux-Sevres, France, assignors to
Melle-Bezons, Melle, Deux-Sevres, France
No Drawing. Filed Nov. 21, 1969, Ser. No. 878,872
Claims priority, application France, July 7, 1969,
6922666
Int. Cl. C07c *49/04, 49/20*
U.S. Cl. 260—593 R                                17 Claims

ABSTRACT OF THE DISCLOSURE

A process for the production of isopropanol and acetone which comprises contacting isobutyraldehyde and an oxygen-containing gas with a liquid reaction medium comprising a liquid solvent maintained at elevated temperature.

---

This invention relates to a process for producing isopropanol and acetone from isobutyraldehyde by oxidizing, or oxidatively decarbonylizing, isobutyraldehyde in the liquid phase.

In accordance with the practice of the present invention, isobutyraldehyde and a molecular oxygen-containing gas are contacted with a liquid reaction medium containing a liquid solvent, and preferably a solid catalyst comprising one or more oxides, hydroxides and salts of the metals of Groups I-B, II-B, III-A, IV-A, V-A, VI-A, VII-A or VIII of the Periodic Table.

The reaction temperature, while not critical, is preferably within the range of 100 to 170° C. The pressure, likewise not critical, may be varied within a wide range, such as from atmospheric pressure, but preferably at a pressure up to about 5 kg./cm.$^2$. The catalyst content of the bath, calculated as the metal oxide or oxides is preferably within the range of 1–10% by weight. Preferred metals comprising the catalyst are one or more of silver, molybdenum, vanadium, chromium, tungsten, nickel, titanium, cerium, manganese and cobalt. As indicated, the preferred form of the catalyst is either the oxide or hydroxide, although a wide variety of salts may be used, including the chloride, the nitrate, the sulfate, organic salts such as the acetate, as well as a wide variety of other salts. The catalyst is preferably dispersed through the reaction mixture containing the liquid solvent.

As used hereinafter, the term "oxygen-containing gas" is meant to refer to and include any gas which contains oxygen, or which is capable of evolving molecular oxygen under the reaction conditions prevailing in the process. For reasons of economy, air is generally the preferred molecular oxygen-containing gas.

A wide variety of solvents or diluents can be employed in the practice of the invention. In accordance with one embodiment, the solvent is preferably a chemically inert liquid which has a boiling point above 200° C. in order to avoid entrainment of the diluent or solvent in the gaseous stream passing through the reaction bath containing the solvent. Illustrative of the large number of solvents or diluents which may be employed are the oxidation-resistant esters, such as carboxylic esters having a branched-chain in their molecule and containing at least 12 carbon atoms, such as 2-ethyl hexyl 2-ethyl hexanoate, 4-methyl 2-ethyl pentyl, 4-methyl 2-ethyl pentanoate, and the like; aliphatic carboxylic acids having a normal chain and containing 8–12 carbon atoms, such as pelargonic, caprylic, capric acids, and the like; aliphatic or aromatic ethers having a high boiling point, such as di(2-ethyl hexyl) ether, di-phenyl ether and the like; aliphatic hydrocarbons containing 12–16 carbon atoms, such as n-dodecane, n-tetradecane; various high boiling silicone oils; and, mixtures of the foregoing solvents.

The preferred operating conditions for this embodiment include a temperature within the range of 110–150° C., a pressure within the range of 0–3 kg./cm.$^2$ (gauge) and catalyst content (calculated as the oxides) of the bath of 1–6% by weight. As will be appreciated by those skilled in the art, the choice of the operating pressure depends upon the reaction temperature and the rate of flow of the oxygen-containing gas. The pressure should not be too high in order to avoid accumulation of undesirable by-products. On the other hand, if the temperature is such that the entrainment rate of the solvent or diluent and/or undesirable by-products in the gases leaving the reaction bath is too high because of insufficient pressure, a distillation unit following the reactor may be conveniently provided in order to separate low boiling products from the reaction effluent whereby high boiling products including the solvent or diluent may be conveniently recycled back to the reaction bath.

In accordance with this embodiment, the conversion of isobutyraldehyde per passage is 35–60%, and generally is in the vicinity of about 50%. When using the preferred metal oxide catalyst of the invention as disclosed above, the practical molar yield of the three primary products of the oxidation reaction is as follows:

|  | Percent |
|---|---|
| Ispropanol | 30–40 |
| Acetone | 30–40 |
| Isobutyric acid | 5–15 |

As will be understood, the impurities frequently found in the final reaction mixture include isopropyl formate, isopropyl isobutyrate, acetic acid, propionic acid, methyl ethyl ketone, di-acetyl, di-isopropyl ether and di-isopropyl ketone. The gaseous by-products are generally:

|  | Percent by volume |
|---|---|
| Carbon monoxide | 70–80 |
| Carbon dioxide | 10–20 |
| Propane | 10–15 |

Water is also produced in the reaction of the present invention, and the raw reaction product contains 5–10% by weight water for the preferred conversion rates disclosed above. Of course, the exact water content depends upon the conversion rate.

In accordance with another embodiment of the present invention, the solvent may be of the type disclosed above, but having a boiling point below 200° C. The preferred "low-boiling" solvent or diluent which has been found to be particularly suitable for the process of the present invention is isobutyric acid. The primary advantage in using isobutyric acid is that this acid is one of the by-products of the isobutyraldehyde oxidation reaction, and hence its use as a diluent or solvent does not contaminate the reaction with a foreign substance, and thereby facilitates separation of the desired products.

When isobutyric acid, which has a relatively low boiling point, is employed as the solvent or diluent, it is advisable to either operate under sufficient pressure to avoid entrainment of the acid in the gases leaving the reaction bath at a rate above that of its formation, or to provide a dephlegmation device to condense and reflux the gases and vapors leaving the bath so as to maintain the bath at a constant volume. As will be appreciated by those skilled in the art, the low boiling diluent or solvent present in the starting bath is gradually replaced as the process proceeds by a high boiling bath primarily containing high boiling by-products of the oxidation reaction.

The reaction pressure of this embodiment is preferably within the range of 0.5 to 5 bars, effective, with the most preferred range being within the range of 1 to about 4 bars, effective. As will be demonstrated hereinafter in Examples 12 and 13, the use of a reactor fitted with a perforated plate for introduction of the oxygen-containing gas provides a good conversion rate and high productivity when a pressure of about 1 bar, effective, is employed.

The catalysts employed are quite active in their dissolved state in the oxidation reaction bath, and hence very small amount of the catalyst, i.e. from 10 to about 1000 p.p.m. of catalyst metal are sufficient. By way of illustration, it is possible to use between 30 and 1000 p.p.m. of molybdenum or 10 to 1000 p.p.m. manganese. In accordance with the concepts of this embodiment, the isobutyraldehyde conversion, per passage, can be as high as 85%, and the practical molar yields for the three primary products of the reaction are as follows:

|  | Percent |
|---|---|
| Isopropanol | 30–40 |
| Acetone | 35–45 |
| Isobutyric acid | 0–15 |

It has been found that the catalyst in the reaction bath serves as a partial destroyer of peroxides which are formed as a by-product of the reaction. As will be appreciated by those skilled in the art, the oxidation of isobutyraldehyde in the liquid bath can be achieved in the absence of a catalyst, although the non-catalytic reaction is disadvantageous in that it frequently leads to dangerous and unacceptable peroxide levels in the bath and in the products separated from the bath. For example, non-catalytic operation can result in as much as 150–200 g. per liter of peroxide, calculated as perisobutyric acid.

The reaction may be carried out in a wide variety of ways. It is generally preferred that the process be carried out continuously by introducing streams of molecular oxygen-containing gas and of liquid isobutyraldehyde into a heated reaction bath containing the catalyst dispersed in the solvent or diluent. The starting bath generally contains a suspension of the catalyst throughout the liquid diluent or solvent which is stirred either by mechanical means or by efficiently dispersing the oxygen-containing gas through the liquid bath. The turbulence in the bath should be sufficient to insure intimate contact of the gas with the liquid isobutyraldehyde and diluent and to insure uniform dispersion of the catalyst throughout the reaction bath.

Recovery of the products of the reaction may conveniently be made by conventional techniques, such as condensation, washing of the non-condensable gases, ordinary distillation and extractive distillation.

The following examples, which are provided by way of illustration, and not by way of limitation, are illustrative of the principal concepts of the present invention.

EXAMPLE 1

A starting reaction bath is prepared by dispersing 100 g. of molybdenum oxide ($MoO_3$) in 2 liters of a mixture of equal volumes of 2-ethyl hexyl 2-ethyl hexanoate and 4-methyl 2-ethyl pentyl 4-methyl 2-ethyl pentanoate.

This bath is placed in a reactor which is a stainless steel vessel having a capacity of 3 liters and which is provided with a rotating stirrer operating at a speed of about 1000 r.p.m. The oxygen-containing gas is introduced through a pipe into the bath and a rotameter is provided in order to measure the feed rate of the gas. The isobutyraldehyde is introduced to the bath by means of a measuring pump.

The gases and vapors leaving the reactor are passed through a gas-liquid separator having a capacity of 200 cubic centimeters, from which the liquid separated is returned to the reactor. The gases leaving the separator are passed through a condenser cooled by tap water, then through a condenser cooled by water maintained at 10° C., and finally through condensers cooled by a mixture of acetone and solid carbon dioxide.

Chromatographic analyses are made on the mixture of the liquids removed in the various condensers, and on the gases leaving the last condenser, which contain small amounts of isobutyraldehyde, acetone and isopropanol, the later in small quantities. These compounds are removed from the gaseous stream by bubbling the gaseous stream through an aqueous solution of a hydroxylamine hydrochloride in order to verify the chromatographic analysis made upon the gases leaving the preceding condenser. In addition, a gas meter is provided in order to measure the rate of removal of the gases washed.

The operating conditions are as follows (the gas volumes, in this example as in the following ones, being calculated under the normal temperature and pressure conditions):

| | |
|---|---|
| Isobutyraldehyde feed rate, g./hr. | 284 |
| Air feed rate, liters/hr. | 300 |
| Temperature of the bath, °C. | 130 |
| Pressure, effective, kg./cm.$^2$ | 1 |

The results are as follows:

| | G./hr. |
|---|---|
| Unconverted isobutyraldehyde | 154 |
| Isopropanol produced | 38 |
| Acetone produced | 35 |
| Isobutyric acid produced | 17 |

The volume of gases discarded after washing amounts to 329 liters/hr., containing 3.3 liters of carbon dioxide, 3.6 liters of propane, 19.8 liters of carbon monoxide and 34 liters of oxygen, the remainder being nitrogen.

The above results indicate:

| | Percent |
|---|---|
| Conversion rate of the isobutyraldehyde, per passage | 45.8 |
| Isopropanol molar yield | 35.1 |
| Acetone molar yield | 33.5 |
| Isobutyric acid molar yield | 10.7 |

EXAMPLE 2

The operation is carried out in the apparatus of Example 1, with the same starting bath.

The operating conditions are as follows:

| | |
|---|---|
| Isobutyraldehyde feed rate, g./hr. | 186 |
| Air feed rate, liters/hr. | 300 |
| Temperature of the bath, °C. | 130 |
| Pressure, gauge, kg./cm.$^2$ | 1 |

The results are as follows:

| | G./hr. |
|---|---|
| Unconverted isobutyraldehyde | 97 |
| Isopropanol produced | 27.5 |
| Acetone produced | 26.6 |
| Isobutyric acid produced | 6.3 |

The volume of gases discarded after washing is 310 liters/hr., containing 3.1 liters of carbon dioxide, 3.5 liters of propane, 18.6 liters of carbon monoxide and 30.4 liters of oxygen, the remainder being nitrogen.

The above results indicate:

| | Percent |
|---|---|
| Conversion rate of the isobutyraldehyde, per passage | 47.8 |
| Isopropanol molar yield | 37.1 |
| Acetone molar yield | 37.1 |
| Isobutyric acid molar yield | 5.8 |

EXAMPLE 3

The operation is carried out in the apparatus for Example 1, with the same starting bath.

The operating conditions are as follows:

| | |
|---|---|
| Isobutyraldehyde feed rate, g./hr. | 250 |
| Air feed rate, liters/hr. | 450 |
| Temperature of the bath, °C. | 120 |
| Pressure, effective, kg./cm.$^2$ | 1 |

The results are as follows:

| | G./hr. |
|---|---|
| Unconverted isobutyraldehyde | 131.5 |
| Isopropanol produced | 35 |
| Acetone produced | 30.8 |
| Isobutyric acid produced | 9.5 |

The volume of gases discarded after washing amounts to 478 liters/hr., containing 6.1 liters of carbon dioxide, 2.7 liters of propane, 21 liters of carbon monoxide and 53.5 liters of oxygen, the remainder being nitrogen.

The above results indicate:

| | Percent |
|---|---|
| Conversion rate of the isobutyraldehyde, per passage | 47.4 |
| Isopropanol molar yield | 35.5 |
| Acetone molar yield | 32.2 |
| Isobutyric acid molar yield | 6.6 |

EXAMPLE 4

The operation is carried out in the apparatus of Example 1, with the same starting bath.

The operating conditions are as follows:

| | |
|---|---|
| Isobutyraldehyde feed rate, g./hr. | 250 |
| Air feed rate, liters/hr. | 450 |
| Temperature of the bath, °C. | 120 |
| Pressure, effective, kg./cm.$^2$ | 2 |

The results are as follows:

| | G./hr. |
|---|---|
| Unconverted isobutyraldehyde | 112.5 |
| Isopropanol produced | 34.5 |
| Acetone produced | 47.1 |
| Isobutyric acid produced | 10.1 |

The foregoing indicate:

| | Percent |
|---|---|
| Conversion rate of the isobutyraldehyde, per passage | 55 |
| Isopropanol molar yield | 30.1 |
| Acetone molar yield | 42.5 |
| Isobutyric acid molar yield | 6 |

EXAMPLE 5

The operation is carried out in the apparatus of Example 1, the starting bath being constituted by a dispersion of 100 grams of molybdenum oxide ($MoO_3$) throughout 2 liters of silicone oil "Fluide SI 550" (trademark of the company SISS, Societe Industrielle des Silicones).

The operating conditions are as follows:

| | |
|---|---|
| Isobuytraldehyde feed rate, g./hr. | 273 |
| Air feed rate, liters/hr. | 300 |
| Temperature of the bath, °C. | 130 |
| Pressure, effective, kg./cm.$^2$ | 1 |

The results are as follows:

| | G./hr. |
|---|---|
| Unconverted isobutyraldehyde | 137 |
| Isopropanol produced | 33.3 |
| Acetone produced | 36.3 |
| Isobutyric acid produced | 13.8 |

The volume of gases discarded after washing is 303 liters/hr., containing 2.4 liters of carbon dioxide, 1.6 liters of propane, 21 liters of carbon monoxide and 26 liters of oxygen, the remainder being nitrogen.

The above results indicate:

| | Percent |
|---|---|
| Conversion rate of the isobutyraldehyde, per passage | 49.8 |
| Isopropanol molar yield | 29.4 |
| Acetone molar yield | 33.1 |
| Isobutyric acid molar yield | 8.3 |

The operation of this example was repeated, except that there was used as a diluent 2 liters of trimethylolpropane tripivalate. The results were substantially the same.

EXAMPLE 6

The process is carried out in the apparatus of Example 1, the starting bath being constituted of a dispersion of 40 grams of silver oxide throughout 2 liters of the silicone oil of Example 5.

The operating conditions are as follows:

| | |
|---|---|
| Isobutyraldehyde feed rate, g./hr. | 230 |
| Air feed rate, liters/hr. | 300 |
| Temperature of the bath, °C. | 130 |
| Pressure | Atmospheric |

The results are as follows:

| | G./hr. |
|---|---|
| Unconverted isobutyraldehyde | 145.5 |
| Isopropanol produced | 25.5 |
| Acetone produced | 24.5 |
| Isobutyric acid produced | 14.9 |

The above results show:

| | Percent |
|---|---|
| Conversion rate of the isobutyraldehyde, per passage | 36.7 |
| Acetone molar yield | 36.0 |
| Isobutyric acid molar yield | 14.4 |

EXAMPLE 7

The process is carried out in the apparatus of Example 1, with the starting bath of Example 6.

The operating conditions are as follows:

| | |
|---|---|
| Isobutyraldehyde feed rate, g./hr. | 253 |
| Air feed rate, liters/hr. | 300 |
| Temperature of the bath, °C. | 120 |
| Pressure | Atmospheric |

The results are as follows:

| | G./hr. |
|---|---|
| Unconverted isobutyraldehyde | 161.3 |
| Isopropanol produced | 24.0 |
| Acetone produced | 21.0 |
| Isobutyric acid produced | 14.2 |

These results indicate:

| | Percent |
|---|---|
| Conversion rate of the isobutyraldehyde, per passage | 36.2 |
| Isopropanol molar yield | 31.4 |
| Acetone molar yield | 28.4 |
| Isobutyric acid molar yield | 12.7 |

EXAMPLE 8

The operation is carried out in the apparatus of Example 1, the starting bath being constituted by a dispersion of 100 grams of chromium oxide $Cr_2O_3$ throughout 2 liters of 2-ethyl hexyl 2-ethyl hexanoate.

The operating conditions are as follows:

| | |
|---|---|
| Isobutyraldehyde feed rate, g./hr. | 275 |
| Air feed rate, liters/hr. | 300 |
| Temperature of the bath, °C. | 120 |
| Pressure | Atmospheric |

The results are as follows:

| | G./hr. |
|---|---|
| Unconverted isobutyraldehyde | 141 |
| Isopropanol produced | 24.5 |
| Acetone produced | 35.6 |
| Isobutyric acid produced | 25.2 |

These results indicate:

| | Percent |
|---|---|
| Conversion rate of the isobutyraldehyde, per passage | 48.8 |
| Isopropanol molar yield | 21.9 |
| Acetone molar yield | 32.9 |
| Isobutyric acid molar yield | 15.4 |

The operation of this example was repeated but using, instead of chromium oxide, oxides of nickel, vanadium, tungsten and titanium, and the results obtained in these various instances were not significantly different from one another. Under the same conditions, ceric oxide gave substantially the same results, but for a lower catalyst content of the bath, namely 1.25% by weight instead of 5%.

EXAMPLE 9

The starting reaction bath contains one liter of isobutyric acid containing 3% by weight of molybdenum oxide ($MoO_3$) and is placed in a stainless steel reaction vessel having a capacity of 3 liters.

There is fed to the bath 585 g. of isobutyraldehyde per hour and 900 Nl. of air per hour.

The operating temperature of 130° C., the pressure is 3.5 bars, effective, and the stirring is achieved by means of an anchor-shaped mechanical stirrer operated at a speed of 1000 r.p.m.

The isobutyraldehyde is introduced by means of a measuring pump and the air with the aid of a rotameter through a pipe opening in the liquid. The vapors entrained by the gases are condensed and the balance of the operation is determined on the condensates and uncondensed gases.

The peroxide content of the bath, calculated as perisobutyric acid, is 7 g./liter.

The total conversion rate of the isobutyraldehyde, per passage, amounts to 64.5%.

The molar yields are as follows:

| | Percent |
|---|---|
| Acetone | 33.6 |
| Isopropanol | 24.9 |
| Isopropyl formate | 9.15 |
| Isopropyl isobutyrate | 3.4 |
| Isobutyric acid | 10.0 |

The productivity to acetone is 102 g. per hour per liter of bath.

EXAMPLE 10

The operation is carried out in the same manner as shown in Example 9, but after filtration of the starting bath containing the catalyst in diseprsed state to remove the portion of the catalyst which is in suspension and to leave only the dissolved portion. The dissolved $MoO_3$ content is 1 g./liter.

The results are as follows:

| | |
|---|---|
| Peroxide content of the bath, g./liter | 8 |
| Total conversion rate of the isobutyraldehyde, per passage, percent | 64 |

Molar yields, percent:

| | |
|---|---|
| Acetone | 35.8 |
| Isopropanol | 23.1 |
| Isopropyl formate | 7.15 |
| Isopropyl isobutyrate | 3.1 |
| Isobutyric acid | 14.0 |

Productivity to acetone, g. per hour per liter of bath ___ 109

EXAMPLE 11

The operation is carried out in the same apparatus and with the same starting bath as in Example 9 but under the following conditions:

| | |
|---|---|
| Pressure | 1 bar, effective. |
| Temperature | 110° C. |

Under these conditions, to maintain the conversion rate of the isobutyraldehyde at about 65% it was necessary to considerably reduce the isobutyraldehyde and air feeds as compared with Example 1.

| | |
|---|---|
| Isobutyraldehyde feed, g./hour | 115 |
| Air feed, Nl./hour | 150 |
| Total conversion rate of the isobutyraldehyde, per passage, percent | 65.4 |

Molar yields, percent:

| | |
|---|---|
| Acetone | 42.2 |
| Isopropanol | 13.5 |
| Isopropyl formate | 14.1 |
| Isopropyl isobutyrate | 5.25 |
| Isobutyric acid | 14.1 |

Productivity to acetone, g. per hour per liter of bath ___ 25.6

An increase of isopropyl formate production and a decrease of isopropanol production are observed.

EXAMPLE 12

The reactor is a vertical tube made of stainless steel having a height of 4 meters and an internal diameter of 57 millimeters. This tube is surrounded by a conventional jacket for temperature control by passage therethrough of cooling fluid, such as water, or heating fluid, such as steam. At the bottom of the tube is provided a device for dispersing air throughout the liquid which is a perforated plate provided with seven holes of a diameter of 1.5 mm. each.

The reactor is surmounted by a distillation column of 2.5 meters height, filled in with packing materials. The gases and vapors leaving the top of the column are passed through a condenser and an aliquot of the liquid condensed therein is refluxed to the top of the column. This reflux is so controlled as to maintain constant the level of the liquid bath in the reactor. Another purpose of the reflux is to constitute a barrier to prevent the isobutyric acid vapors from escaping from the top of the column.

The starting reaction bath is constituted by 4 liters of isobutyric acid containing in dissolved state 100 p.p.m. of manganese brought into play in the form of its acetate.

The operating conditions are as follows:

| | |
|---|---|
| Temperature of the bath | 123° C. |
| Pressure | 1 bar, effective. |
| Isobutyraldehyde feed | 880 g./hour. |
| Air feed | 2200 Nl./hour. |

The total conversion rate of the isobutyraldehyde, per passage, is 79%.

The molar yields are as follows:

| | Percent |
|---|---|
| Acetone | 62.0 |
| Isopropanol | 23.0 |
| Isopropyl formate | 1.5 |
| Isopropyl isobutyrate | 0.8 |
| Isobutyric acid | 4.4 |

The productivity to acetone is 83.5 g. per hour per liter of bath.

EXAMPLE 13

The operation is carried out in the apparatus of Example 12, with a starting bath constituted by 2.9 liters of isobutyric acid containing in dissolved state 15 p.p.m. of manganese brought into play in the form of its acetate.

The operating conditions are as follows:

| | |
|---|---|
| Temperature of the bath | 126° C. |
| Pressure | 1 bar, effective. |
| Isobutyraldehyde feed | 1440 g./hour. |
| Air feed | 2200 Nl./hour. |

The total conversion rate of the isobutyraldehyde, per passage, is 72%.

The molar yields are as follows:

| | Percent |
|---|---|
| Acetone | 57.0 |
| Isopropanol | 26.0 |
| Isopropyl formate | 1.2 |
| Isopropyl isobutyrate | 0.9 |
| Isobutyric acid | 1.8 |

The productivity to acetone is 134 g. per hour per liter of bath.

It will be apparent from the foregoing that we have provided a new and improved process for producing isopropanol and acetone by the reaction of isobutyraldehyde and an oxygen-containing gas in the liquid phase. In the process of the present invention a simple and accurate method is provided for preparing isopropanol and acetone in good yields and with good conversions.

It will be understood that various modifications may be made in the details of formulation and operating conditions without departing from the spirit of the invention, especially as defined in the following claims.

What is claimed is:

1. A process for the production of isopropanol and acetone which comprises contacting isobutyraldehyde and a free oxygen-containing gas with at least one catalyst consisting essentially of a compound selected from the group consisting of the oxides and hydroxides of a metal selected from the group consisting of molybdenum, silver, chromium, manganese, nickel, vanadium, tungsten, titanium and cerium in a liquid medium at a temperature within the range of 100°–170° C.

2. A process as defined in claim 1 wherein said catalyst is dispersed throughout said liquid medium.

3. A process as defined in claim 1 wherein said catalyst is present in said liquid medium in an amount corresponding to 1 to 10% by weight calculated on the basis of the metal oxide.

4. A process as defined in claim 1 wherein the liquid medium contains a liquid diluent having a boiling point within the range of 200°–305° C. which is chemically inert under the reaction conditions.

5. A process as defined in claim 4 wherein said diluent is selected from the group consisting of 2-ethyl hexyl 2-ethyl hexanoate, 4-methyl 2-ethyl pentyl 4-methyl 2-ethyl pentanoate and trimethylol propane tripivalate.

6. A process as defined in claim 4 wherein said inert diluent comprises an aliphatic carboxylic acid having 8 to 12 carbon atoms.

7. A process as defined in claim 6 wherein said acid is selected from the group consisting of pelargonic acid, caprylic acid and capric acid.

8. A process as defined in claim 4 wherein said diluent is selected from the group consisting of di(2-ethyl hexyl) ether and diphenyl ether.

9. A process as defined in claim 4 wherein said diluent comprises an aliphatic hydrocarbon having 12 to 16 carbon atoms.

10. A process as defined in claim 9 wherein said hydrocarbon is selected from the group consisting of n-dodecane and n-tetradecane.

11. A process as defined in claim 1 wherein the reaction is carried out at a pressure within the range of 1–4 bars.

12. A process as defined in claim 1 wherein said oxygen-containing gas is air.

13. A process as defined in claim 1 wherein an inert diluent having a boiling point within the range of 200°–305° C. is present in the liquid medium, the reaction temperature is within the range of 110–150°C. and the pressure is within the range of 0–3 kg./cm.$^2$ gauge.

14. A process as defined in claim 1 wherein the liquid medium contains a solvent for the reactants, the reaction products and the catalyst, said solvent having a boiling point within the range of 163°–200° C.

15. A process as defined in claim 14 wherein said solvent is isobutyric acid.

16. A process as defined in claim 14 wherein the catalyst is present in an amount within the range of 10–1,000 p.p.m.

17. A process as defined in claim 1 wherein the catalyst is an acetate of said metal.

References Cited
UNITED STATES PATENTS

| | | | |
|---|---|---|---|
| 3,247,249 | 4/1966 | Saffer et al. | 260—530 R |
| 2,010,358 | 8/1935 | Groll et al. | 260—530 R |
| 3,496,197 | 2/1970 | Van Reenen | 260—593 R |

FOREIGN PATENTS

| | | | |
|---|---|---|---|
| 1,133,882 | 11/1968 | Great Britain | 260—593 R |

DANIEL D. HORWITZ, Primary Examiner

U.S. Cl. X.R.

252—431, 438, 440, 441, 442, 463, 467, 471, 472, 475, 476; 260—530 R, 635 R

Disclaimer 3,767,711.—*Georges Gobron*, *Claude Gilbert Falize*, and *Henri Dufour*, Melle, Deux-Sevres, France. PROCESS FOR PRODUCING ISOPROPANOL AND ACETONE. Patent dated Oct. 23, 1973. Disclaimer filed June 12, 1975, by the assignee, *Melle-Bezons*.

Hereby enters this disclaimer to claim 17 of said patent.

[*Official Gazette September 2, 1975.*]